UNITED STATES PATENT OFFICE.

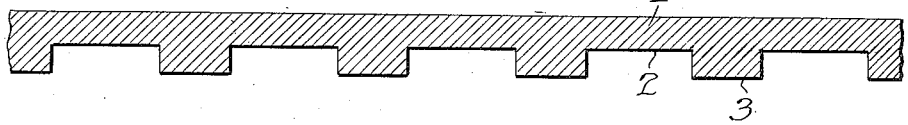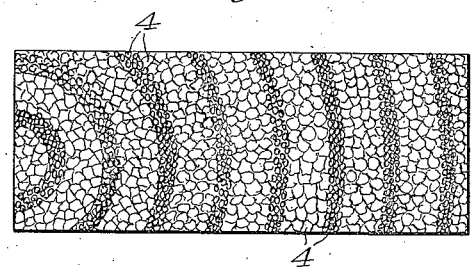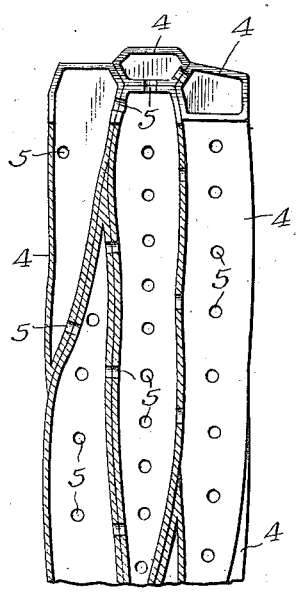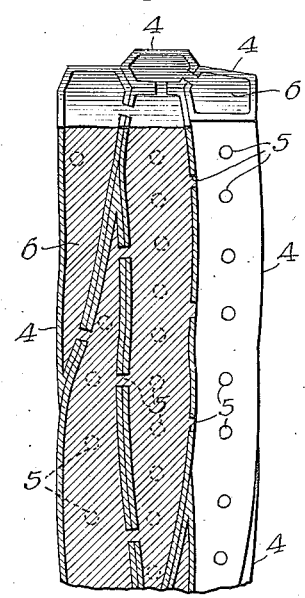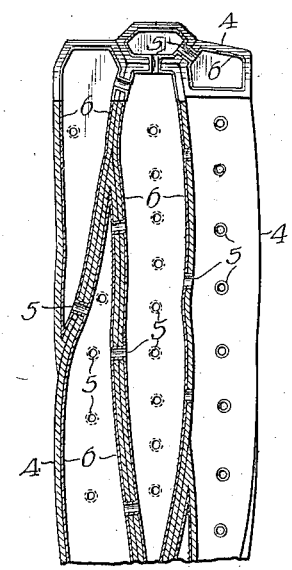

RUFUS N. CHAMBERLAIN, OF CHICAGO, ILLINOIS, ASSIGNOR TO GOULD STORAGE BATTERY COMPANY, A CORPORATION OF NEW YORK.

SEPARATOR FOR BATTERIES.

1,194,818.      Specification of Letters Patent.     Patented Aug. 15, 1916.

Application filed September 19, 1913. Serial No. 790,653.

*To all whom it may concern:*

Be it known that I, RUFUS N. CHAMBERLAIN, a citizen of the United States of America, and a resident of Chicago, county of Cook, and State of Illinois, have invented certain new and useful Improvements in Separators for Batteries, of which the following is a specification.

This invention relates to improvements in wood separators for storage batteries, and more particularly to methods of treating such separators to render them more efficient and durable.

The main objects of this invention are to provide an improved quality of wood separators for storage batteries; and to provide improved means and method for treating such separators adapted to render them inert with respect to the electrolyte without interfering seriously with their porosity, and adapted to render practical the use of very thin separators.

In storage battery practice for motor vehicles it is customary to provide porous or finely perforated separators of suitable insulating material for insertion between the plates of opposite polarity, so as to permit close spacing of the plates, and to prevent short-circuiting of the battery either by buckling and resultant contact of adjacent battery plates or by conductive objects becoming lodged between the plates, such for instance as scale or active material from the plates themselves, or foreign bodies accidentally dropped into the battery. Such separators while inherently non-conductors must be sufficiently open and porous in character to permit saturation with electrolyte so as to render them substantially conducive to the battery current by virtue of the electrolyte held in the pores.

Wood is especially adapted for use as separators because of its light porous nature, its inherent insulating qualities, when dry, its low cost, and the ease with which it may be formed into thin plates. It has been found that wood separators, as heretofore used, whether the wood has been treated or not, deteriorate rapidly under the action of the acid in the electrolyte, causing short-circuits in the battery, besides entailing great expense for frequent renewals of such separators.

The destructive forces acting on the wood separators in a vehicle battery are especially severe because of the greater density and strength of the acid electrolyte than in stationary batteries, the relatively high current rates of charge and discharge and resultant higher temperature, and the mechanical wear and tear due to the shaking and jarring of the elements when the vehicle is in use.

It is known that coating or impregnating wood where it is used in batteries, with an inert material or body adapted to combine with or adhere closely to the fibers, such for instance as a material having the general properties or qualities of paraffin, will protect the wood and retard deterioration; but as ordinarily applied such material closes all of the pores and prevents saturation of the wood with electrolyte, therefore rendering it useless as a separator.

The present invention contemplates impregnating or coating with any suitable inert material and by any suitable process the cell or fiber structure of the separator in such manner as to protect it from the electrolyte without however leaving the cells or the larger or so-called sensible pores thereof completely filled with said inert material.

In carrying out this invention, I prefer to first impregnate the separator with an inert material, that is to say a substance which will not be affected by the electrolyte, such as paraffin, ceresin, or the like, and then remove the greater part of such inert material, leaving a thin protective film upon the wood fibers and lining the cells and pores, thus leaving the wood texture open and pervious to the electrolyte, and at the same time protecting the substance of the wood. To this end I first thoroughly saturate the wood separators with the inert melted material, and then drive off the surplus protecting material after removal from the saturating tank, by means of heat, as for instance by placing in an oven, or by dipping the plates in hot water of suitable temperature. In this instance the hot water being heavier than the filler or protective material, drives off and replaces all excess of the latter and leaves only the material which is in very intimate contact with the fibers of the wood. It appears that by this process the wood fibers severally become thinly coated and the cells become lined with a thin film of the protective material which adheres intimately and permanently thereto, while the surplus material filling the pores of the wood is driven off by the heat or floated away by the hot water.

The accompanying drawings illustrate the changes which are believed to take place in the wood when treated according to my invention.

Figure 1 is an enlarged cross section of a wood separator made in accordance with this invention. Fig. 2 is a magnified cross section of wood illustrating the cellular or porous structure and showing concentric annual layers of large cells alternating with layers of smaller cells. Fig. 3 is a greatly magnified sectional perspective view showing both the transverse and longitudinal sectional structure of untreated wood. Fig. 4 is a similar view showing the wood with its cells and pores filled with the protective material and represents one step in the process of manufacture of the improved separators. Fig. 5 is a similar view showing the wood with its cell walls covered with a thin film of protective material, but with the cells and pores open, and representing the condition of the wood after the process is completed.

The separator shown comprises a thin wood sheet 1 having alternate vertical grooves 2 and ribs 3 formed on one side and running parallel with the grain. These grooves serve as passage ways for the electrolyte and facilitate circulation thereof. The wood consists substantially of a mass of hollow cells 4 interconnected by pores 5. The protective material 6 is so thinly distributed and so intimately associated with the wood structure, by the process herein specified, that the porosity of the separator with respect to the electrolyte is substantially unaffected.

The treated separators may be dried and crated for shipment, or for storage until wanted for use. The paraffin or other protective material used prevents shrinkage and warping.

Separators treated in accordance with this invention may be made thinner than otherwise, thus economizing space and material.

When the separators are to be installed in a battery they should first be thoroughly soaked in electrolyte, if not already wet, so as to become well saturated therewith and rendered conductive thereby. Otherwise the battery should be allowed to stand for a time after the separators are installed, so that the latter may become saturated before the battery is used.

Formerly it has been customary to prepare wood separators by soaking the untreated boards in weak alkali water or in a weak acid to remove deleterious chemicals. Separators thus treated cannot be dried for storage owing to their great tendency to shrink and warp out of shape when dry. Hence if so treated they have to be kept wet, and preferably immersed in water, to prevent becoming useless. By my present invention, this difficulty is overcome and the separators may be dried without harm and may be so stored indefinitely. Separators may also be given nitrifying treatments but must be kept always moist because of the violently combustible and explosive nature of nitrified wood when dry.

Although but one specific embodiment of this invention is herein shown and described, it will be understood that the separators may be variously formed, and that the means for carrying out my improved process may be varied somewhat without departing from the spirit of this invention, as defined by the following claims.

I claim:

1. A wood separator for storage batteries having substantially its natural properties with a film of inert material lining the pores thereof.

2. A wood separator for storage batteries having substantially its natural structural formation and containing its natural constituents, and protected throughout its structure by a thin lining of inert material not filling the pores.

3. A wood separator for storage batteries comprising a piece of wood of substantially its natural structural formation and porosity and having its fibers thinly coated with inert material to retard the action of electrolyte on the constituents thereof but not filling the pores.

4. A battery separator comprising a wood diaphragm retaining substantially its natural porosity and all its natural constituents and having a film of inert material adapted to retard the action of the electrolyte upon the constituents of the wood without substantially affecting its natural permeability.

5. A wood separator for storage batteries having its natural pores lined with a material unaffected by dilute sulfuric acid.

6. A wood separator for storage batteries having substantially its natural structural formation with its fiber incased in a material inert to dilute sulfuric acid but not filling the pores.

7. A separator for storage batteries comprising a relatively thin plate of wood having a protective coating throughout its inner surfaces but not filling the pores.

8. A wood separator for storage batteries having a thin film of protective material disposed upon the surface of the inner fibers throughout the wood but not filling the pores.

9. As an article of manufacture, an absorbent wood separator having a thin coat of acid-resistant material intimately combined with the interior fibers thereof and rendering the same inert with respect to an electrolyte which enters the pores when the separator is immersed in such electrolyte.

10. As an article of manufacture, a wood separator for batteries, the pores of which are open but thinly lined with inert material adapted to protect the interior fibers from the electrolyte.

11. A separator for storage batteries comprising a piece of wood of natural composition and structure having its interior thinly coated with paraffin.

12. The process of treating a wood separator which consists in impregnating it with a protecting material and subsequently expelling by heat all of such material but an adherent film which remains attached to the wood fibers as a thin coating lining the pores which are left open.

13. The process of treating wood which consists in impregnating it with a normally solid paraffin-like protective material insoluble in water and inert to weak acid, and subsequently soaking it in hot water sufficiently to expel such a part of said material, as to open the pores and at the same time leave a protective film of said material on the interior fibers of the wood.

14. The process of treating wood separators for storage batteries which consists in applying to the fibers of the wood, without clogging the pores, a thin protective coating of paraffin-like material adapted to prevent the acid electrolyte contained in and percolating through the pores from attacking the cell and walls injuring the wood.

15. The process of treating a wood separator, which consists in impregnating it with a liquid material of the nature of melted paraffin whereby the wood fibers become saturated and covered with a strongly fixed coating of said material, and subsequently immersing the same in hot water and thereby expelling such a part of the material as to leave a thin protective film of said material fixed upon the inner fibers and the pores thereof open.

Signed at Chicago this 15th day of September, 1913.

RUFUS N. CHAMBERLAIN.

Witnesses:
  EUGENE A. RUMMLER,
  M. IRENE HUTCHINGS.